United States Patent Office

3,026,359
Patented Mar. 20, 1962

3,026,359
PROCESS FOR PREPARING POLYFLUORO-
ALKANES OF HIGH PURITY
Sebastian V. R. Mastrangelo, Wilmington, Del., and
Frederic W. Swamer, Boothwyn, Pa., assignors to E. I.
du Pont de Nemours and Company, Wilmington, Del.,
a corporation of Delaware
No Drawing. Filed Mar. 16, 1960, Ser. No. 15,276
12 Claims. (Cl. 260—653)

This invention relates to a process for preparing polyfluoroalkanes of highly purity from binary mixtures with less highly fluorinated fluorohaloalkanes which also contain halogen other than fluorides, particularly by an adsorption procedure.

Fluorine-containing halomethanes and heloethanes are well known compounds which are useful for a variety of purposes such as refrigerants, solvents, propellents for aerosol formulations, fire extinguishing agents, and as reactants for the preparation of other fluorine-containing compounds. Usually, they are obtained by halogen exchange reactions, that is, by exchanging fluorine or bromine by various methods. A representative general method comprises treating a chlorinated or brominated methane or ethane with hydrogen fluoride in the presence of a catalyst which is usually a heavy metal salt. Such halogen exchange reactions seldom give rise to a single pure fluorinated product, but usually produce a mixture of compounds containing varying amounts of fluorine, whereby a purification process or processes must be employed to produce a pure product.

For some uses, it is necessary that the fluorinated compounds be pure. In some cases, even trace amounts of more or less highly fluorinated products will sufficiently alter the physical properties of a particular fluorinated compound to render it much less useful in some physical processes. In many cases, where a compound is to be used as a chemical intermediate, the presence of trace quantities of a more or less highly fluorinated compound can greatly alter the nature of the products obtained from reactions of the intermediate. Compounds of similar structure often vary greatly in their physiological effects on human beings and, if a particular compound which is harmless when pure is to come in contact with humans, it is important that such material be pure.

It is well known that mixtures may be at least partially separated by fractional distillation. The degree of separation of two components of a mixture by fractional distillation depends on several factors, some of which may be varied. Distillation theory tells us, however, that complete separation of two materials requires conditions which cannot generally be attained. Therefore, the lower boiling member of a mixture cannot be obtained completely free of the higher boiling members, although it is usually possible to obtain the higher boiling member free of the lower boiling members of the mixture by distillation. Even if complete purity is not required, fractional distillation has disadvantages, especially when applied to the lower boiling materials. Thus, carbon tetrafluoride has a critical temperature of −45° C., requiring distillation at lower temperatures such as −60° C. where the vapor pressure is 350 p.s.i.a. (24 atmospheres), a rather high distillation pressure. A further difficulty is that any compound near its critical point exhibits nearly equal liquid and vapor densities, making fractionation inefficient since the liquid and gas phases do not separate well in the column. Fractional distillations at low temperatures, regardless of efficiency, are expensive to operate, over and above the expensive pressure equipment usually required, due to the large refrigeration capacity needed to maintain the equipment and contents at low temperature. Thus, it can be seen that fractional distillation of low boiling fluorinated haloalkanes is expensive and cannot give completely pure materials.

It is known that some fluorinated hydrocarbons can be largely separated from non-fluorinated hydrocarbons by an adsorption procedure wherein the hydrocarbons are adsorbed on a solid porous adsorbent material. When dealing with mixtures of substances, it is usually the case that one material is more readily adsorbed than the other, but since the extent of adsorption is influenced by all the substances present and the conditions employed, it ordinarily cannot be predicted to what extent preferential adsorption will take place. Generally, an adsorption procedure does not cause a complete separation, but an equilibrium exists between the adsorbed and non-adsorbed materials such that some of the preferentially adsorbed material is present in the unadsorbed state and remains admixed with the less preferentially adsorbed material. Cases, where one material is completely adsorbed and the other material is only very little adsorbed, are rare and usually cannot be predicted.

It is an object of this invention to provide a process for preparing polyfluoromethanes and ethanes of high purity. A particular object is to provide a method for separating highly fluorinated methanes and ethanes from binary mixtures thereof with less highly fluorinated methanes and ethanes, so as to obtain the more highly fluorinated compounds in a pure form. A further object is to provide a process for accomplishing the above objects by means of an adsorption procedure. Other objects are to advance the art. Still other objects will appear hereinafter.

The above and other objects may be accomplished by this invention which comprises a process for separating a polyfluoroalkane of the formula $C_nF_aH_cX_d$ from a binary mixture thereof with a minor proportion of a fluorohaloalkane of the formula $C_nF_bH_cX_e$ in which formulas $n$ is an integer of 1 to 2 and is the same for both members of the mixture, $a$ is an integer of 2 to 6 and is equal to at least $2n$, $c$ is an integer of 0 to 2, X is a halogen having an atomic weight between 35 and 80 and is the same in both members of the mixture, $d$ is an integer of 0 to 1, $b$ equals $a-1$, $e$ equals $d+1$, and each of $a+c+d$ and $b+c+e$ is equal to $2n+2$, which process comprises passing said binary mixture in the vapor phase over a solid adsorbent which is a member of the group consisting of silica gel, activated charcoal and activated alumina at a pressure of from about 1 to about 5 atmospheres and a temperature between the boiling point of the fluorohaloalkane and about 20° C. above said boiling point, employing a flow rate of from 0.1 to about 20 volumes of said binary mixture (calculated as a gas at 1 atmosphere and 25° C.) per volume of said solid adsorbent per minute, adsorbing said fluorohaloalkane on the solid adsorbent, and recovering the purified unadsorbed polyfluoroalkane.

It has been found that, by the process as above defined, the less highly fluorinated fluorohaloalkane is completely adsorbed on the solid adsorbent and the more highly fluorinated polyfluoroalkane is obtained in a pure state, that is, contains no detectable amounts of the less highly fluorinated fluorohaloalkane as determined by analytical methods which detect as little as 30 parts of the fluorohaloalkane in a million parts of the polyfluoroalkane (p.p.m.). Apparently, very little of the more highly fluorinated polyfluoroalkane is adsorbed on the solid adsorbent, as none could be detected thereon by methods which would detect as little as 0.1% by weight of the adsorbent. Such extreme differentiation in adsorption between the pairs of compounds, providing an apparently complete separation thereof, is most unusual and could not be predicted.

Also, the adsorption procedure is considerably more economical than fractional distillation of such low-boiling compounds. Adsorption systems are less expensive than distillation. More particularly, the refrigeration requirements for maintaining an adsorption tube at a low temperature, such as −80° C., are considerably less than a fractional distillation system of equivalent capacity because there is less metallic equipment to cool, none of the gaseous material has to be liquefied, and there is no liquid reflux return and boil-up which adds heat to the system.

Representative fluorine-containing methanes and ethanes which may form members of the binary mixtures to be treated by the process of this invention, together with their boiling points at atmospheric pressure, are given in Table I below:

TABLE I

*Boiling Points*

| Compound | Boiling Point, °C. | Compound | Boiling Point, °C. |
|---|---|---|---|
| $CF_4$ | −128 | $C_2F_4Br_2$ | 46.5 |
| $CF_3Cl$ | −81.4 | $CH_2F_2$ | −51.7 |
| $CF_3Br$ | −57.8 | $CH_2FCl$ | −9.1 |
| $CF_2Cl_2$ | −29.8 | $CHF_2Br$ | −15 |
| $CFCl_3$ | 23.77 | $C_2F_5H$ | −48.5 |
| $CF_2Br_2$ | 24.5 | $CHF_2Cl$ | −40.8 |
| $C_2F_6$ | −78.1 | $CHFCl_2$ | 8.9 |
| $C_2F_5Cl$ | −38.7 | $CHF_3$ | −82.0 |
| $C_2F_4Cl_2(1,2)$ | 3.55 | $CHClFCF_3$ | −12 |
| $C_2F_5Br$ | −22. | $CHF_2CClF_2$ | −10.2 |

The mixtures of compounds which are to be separated by the process of this invention are binary mixtures of polyfluoromethanes of the formula $CF_aH_cX_d$ with minor proportions of fluorohalomethanes of the formula $CF_bH_cX_d$ in which formulas $a$ is an integer of 2 to 4, $c$ is an integer of 0 to 2, X is a halogen having an atomic weight between 35 and 80 and when present in the polyfluoromethane is the same in both members of the mixture, $d$ is an integer of 0 to 1, $b$ equals $a-1$, $e$ equals $d+1$, and each of $a+c+d$ and $b+c+e$ is equal to 4; and binary mixtures of polyfluoroethanes of the formula $C_2F_aH_cX_d$ with a minor proportion of a fluorohaloethane of the formula $C_2F_bH_cX_e$ in which formulas $a$ is an integer of 4 to 6, $c$ is an integer of 0 to 2, X is a halogen having an atomic weight between 35 and 80 and when present in the polyfluoroethane is the same in both members of the mixture, $d$ is an integer of 0 to 1, $b$ equals $a-1$, $e$ equals $d+1$ and each of $a+c+d$ and $b+c+e$ is equal to 6. In other words, in each of the mixtures, the fluorohaloalkane contains one less $(a-1)$ fluorine atom and one more $(d+1)$ chlorine or bromine atom than the polyfluoroalkane. Also, in such mixtures, the halofluoroalkane will have a normal boiling point at least 39° C. higher than that of the polyfluoroalkane.

Such mixtures are of the character of those obtained by halogen exchange reactions wherein fluorine is exchanged for chlorine or bromine in a polychloromethane or ethane or a polybromomethane or ethane. The process is particularly adapted to the treatment of mixtures of fluorine-containing methanes and is most efficient when applied to such mixtures. The preferred binary mixtures are those in which the polyfluoromethane is devoid of halogen other than fluorine, that is, mixtures of polyfluoromethanes of the formula $CF_aH_c$ with minor proportions of a fluorohalomethane of the formula $CF_bH_cX_e$ in which formulas $a$ is an integer of 2 to 4, $c$ is an integer of 0 to 2, $b$ equals $a-1$, X is a halogen having an atomic weight between 35 and 80, $e$ is an integer of 1 to 2, and each of $a+c$ and $b+c+e$ is equal to 4. Typical mixtures which may be separated are:

$CF_4+CF_3Cl$, $CF_4+CF_2Cl_2$, $CF_3Cl+CF_2Cl_2$
$CF_4+CF_3Br$, $CF_4+CF_2Br_2$, $CF_3Br+CF_2Br_2$
$CHF_3+CHClF_2$, $CHF_3+CHBrF_2$, $CHBrF_2+CF_2Br_2$
$C_2F_6+C_2F_5Cl$, $C_2F_6+C_2F_4Cl_2$, $C_2F_6+C_2F_5Br$
$C_2F_6+C_2F_4Br_2$, $C_2F_5Cl+C_2F_4Cl_2$, and
$CF_3CHF_2+C_2HClF_4$ The less highly fluorinated fluorohaloalkane should form a minor proportion of the binary mixture. Usually, it will constitute up to about 22% by volume, but preferably will be no more than about 5% by volume. As the proportion of the less highly fluorinated fluorohaloalkane increases, the adsorbent becomes saturated more quickly and hence the amount of the mixture which can be effectively treated decreases. When the less highly fluorinated fluorohaloalkane constitutes the major constituent of the mixture, the process generally becomes economically impractical.

The solid adsorbents which may be used in the process of this invention are activated charcoal, silica gel, and activated alumina. Of these, activated alumina is the least effective. Activated charcoal is preferred and is far more effective than the other adsorbents.

Activated charcoals are well known to the art. That which is particularly preferred is a high surface charcoal prepared from wood and sold under the tradename of "Norit." Other useful charcoals are prepared from other forms of vegetable matter, e.g. cocoanut charcoal. These various forms of active vegetable charcoals differ somewhat in their ability to adsorb gases but they are all useful in the present process.

Silica gel is a precipitated form of silica having the approximate composition $H_2SiO_3$. It is prepared by adding acid to a concentrated sodium silicate solution forming a jelly of colloidal, hydrated silica. The jelly is broken up, washed and dried, forming a glassy amorphous solid. After drying at 100° C., the solid contains 13% water and is insoluble. A water content of 4% is attained by heating at 900° C.–1000° C. The properties of silica gel from various sources vary considerably. All types, however, appear to be useful in the present process.

Activated alumina is formed by dehydrating aluminum hydroxide at elevated temperature followed by treating with an acid and then drying. There appears to be no particular preferred type.

Apparently, there is very little, if any, effect of the particle size of the adsorbent on the efficiency thereof in the process of this invention. However, very small particles cause a considerable resistance to flow of the gas through the adsorbent and hence are undesirable. Usually, it is preferred that the adsorbent have a particle size of from about 6 to about 20 mesh. The term "mesh" refers to the number of openings per inch in U.S. standard sieves.

The process comprises passing the binary mixture of fluorine-containing haloalkanes in the vapor phase over the solid adsorbent at a pressure of from about 1 to about 5 atmospheres and a temperature between the boiling point of the fluorohaloalkane (the higher boiling component) and about 20° C. above said boiling point (about 40° C. for activated charcoal), employing a flow rate from 0.1 to about 20 volumes of said binary mixture (calculated as a gas at 1 atmosphere and 25° C.) per volume of said solid adsorbent per minute. By "the boiling point of the fluorohaloalkane" is meant the temperature at which that compound boils under the pressure employed. The passage of the vapors over the adsorbent may be continued until a detectable amount of the less highly fluorinated and higher boiling fluorohaloalkane appears in the effluent or off-gas.

Naturally, the adsorbent does not continue to adsorb the one component indefinitely, but eventually becomes saturated therewith and loses its efficiency. When the adsorbent becomes saturated, it is freed of the adsorbed material. This is readily accomplished by heating the saturated adsorbent to a suitable temperature at which the material is desorbed, which usually will be somewhat higher than maximum adsorption temperature for the particular material and adsorbent. An inert gas purge and/or reduced pressure may also be applied, if desired. For example, adsorbed chlorotrifluoromethane ($CF_3Cl$) may be removed from activated charcoal by warming to 25° C. in a slow stream of nitrogen. Also, if desired, the fluorohaloalkane that is removed from the adsorbent may be recovered.

In general, the flow rate may be varied from about 0.1 to about 20 volumes of gas per volume of adsorbent per minute (cc./cc./min.). Usually, however, it will be preferred to employ from about 1 to about 12 volumes of gas per volume of adsorbent per minute. Optimum conditions will vary somewhat with the adsorbent and the materials being separated.

The process may be carried out at atmospheric pressure or at any superatmospheric pressure that may be desired. Usually, however, the pressure will be from about 1 to about 5 atmospheres. Although adsorption may be improved at superatmospheric pressures, it will generally be preferred and most convenient to operate at atmospheric pressure.

The temperature employed should be between the boiling point of the higher boiling component (the less highly fluorinated fluorohaloalkane) at the pressure employed and about 20° C. above said boiling point, particularly when the adsorbent is silica gel or activated alumina. When the adsorbent is activated charcoal, particularly a high surface activated charcoal, the process can be operated effectively at temperatures as high as 40° C. above the boiling point of the higher boiling component, although it will still be preferred to operate at not more than about 20° C. above said boiling point. At temperatures materially higher than those above specified, the adsorbents lose their ability to adsorb the less highly fluorinated fluorohaloalkane. At temperatures materially below the boiling point of the less highly fluorinated fluorohaloalkane, strong adsorption of the volatile, lower boiling component (polyfluoroalkane) is initiated and, although the material which passes through the adsorbent is pure, considerable amounts of both components of the mixture are adsorbed on the adsorbent and must be reworked or discarded.

In order to more clearly illustrate this invention and the advantageous results to be obtained thereby, a number of examples are given hereinafter in Table II. In these examples, the adsorbent was placed in a tube which was fitted with suitable means for maintaining the desired temperature. The activated charcoal ("Norit," a wood charcoal) was activated before use by heating at about 200° C. and at less than 5 mm. pressure for about 1.5 hours. The silica gel and the activated alumina were also activated by heating to about 300° C. and at less than 5 mm. pressure. The purpose of the treatments was to remove adsorbed water.

After the adsorbent was placed in the tube, the binary mixture in the vapor phase was passed through the adsorption column until the higher boiling component became detectable in the off-gas stream and the purified lower boiling component was collected. The pressure employed was about atmospheric, except where a different pressure is specifically indicated in the table. From the amount of the material purified, the amount of material adsorbed, and the known weight and volume of the adsorbent, the data shown in Table II were determined. The concentration of the minor component in the major component, after purification, was determined by means of a high resolution vapor phase chromatograph which could detect a minimum of 30 p.p.m. of the minor component in the major component. The effects of the adsorbents, the nature of the components, and the concentrations thereof in the mixture, and to some extent the flow rate, are demonstrated in the Table II.

In the third column of Table II, percent v./v. represents the volume percent of the minor component (less highly fluorinated fluorohaloalkane) in the mixture, this being equal to mole percent. The flow rate in the fourth column is the amount of mixture entering the adsorption column in cc. of gas (calculated at normal temperature and pressure) per cc. of adsorbent per minute. The sixth column of the Table II shows the number of grams of the mixture which were purified per gram of adsorbent before the off-gas contained detectable amounts of the higher boiling component (generally, 30 p.p.m.). Likewise, the seventh column of the table shows the number of grams of the mixture which were purified per cc. of adsorbent before impurities were detected in the off-gas. The last column of Table II shows the weight percent of the material adsorbed, based on the weight of the adsorbent. Such adsorbed material was the less highly fluorinated fluorohaloalkane (higher boiling component), such amount of impurity being that adsorbed by the adsorbent before detectable amounts of such impurity appeared in the off-gas.

TABLE II

| Ex. No. | Adsorbent | Mixture and Concen. percent v./v. | Flow Rate cc./cc./min. | T, ° C. | g. purified / g. adsorbent | g. purified / cc. adsorbent | Wt. percent of Material Adsorbed |
|---|---|---|---|---|---|---|---|
| 1 | Silica-gel<sup>a</sup> 10/20 mesh | $CF_4$+1.15% $CF_3Cl$ | 6.67 | −80 | 5.1 | 3.4 | 6.94 |
| 2 | Silica-gel<sup>a</sup> 10/20 mesh | $CF_4$+0.15% $CF_3Cl$ | 6.0 | −80 | 5.5 | 3.7 | 0.96 |
| 3 | Silica-gel<sup>a</sup> 10/20 mesh | $CF_4$+0.15% $CF_3Cl$ | <sup>b</sup> 6.67 | −80 | 6.2 | 4.1 | 1.0 |
| 4 | Activated Charcoal "Norit" 10/20 mesh | $CF_4$+0.33% $CF_3Cl$ | 1.8–6.5 | −80 | 31 | 8.8 | 10.2 |
| 5 | Activated Charcoal "Norit" 10/20 mesh | $CF_4$+0.33% $CF_3Cl$ | 1.8–6.5 | −80 | 30.2 | 8.6 | 9.94 |
| 6 | Activated Charcoal "Norit" 10/20 mesh | $CF_4$+0.33% $CF_3Cl$ | 1.8–6.5 | −80 | 29.7 | 8.5 | 9.80 |
| 7 | Activated Charcoal "Norit" 10/20 mesh | $CF_4$+0.33% $CF_3Cl$ | 4.15–12.1 | −64 | 17.28 | 4.7 | 5.71 |
| 8 | Activated Charcoal "Norit" 10/20 mesh | $CF_4$+0.33% $CF_3Cl$ | 4.15–12.1 | −64 | 16.25 | 4.4 | 5.37 |
| 9 | Activated Charcoal "Norit" 10/20 mesh | $CF_4$+0.33% $CF_3Cl$ | 4.15–12.1 | −64 | 15.95 | 4.3 | 5.27 |
| 10 | Silica-gel<sup>a</sup> 8/14 mesh | $CF_4$+0.33% $CF_3Cl$ | 6.25 | −64 | 2.42 | 1.6 | 0.8 |
| 11 | Activated Charcoal "Norit" 6/12 mesh | $CF_4$+1.13% $CF_3Cl$ | 10.0 | −64 | 8.3 | 3.0 | 12.2 |
| 12 | Activated Charcoal "Norit" 6/12 mesh | $CF_4$+1.13% $CF_3Cl$ | 10.0 | −64 | 7.81 | 2.8 | 11.15 |
| 13 | Activated Charcoal "Norit" 12/20 mesh | $C_2F_6$+5.0% $C_2F_5Cl$ | 2.0 | −30 | 3.5 | 1.1 | 17.5 |
| 14 | Silica-gel<sup>a</sup> 8/14 mesh | $C_2F_6$+5.0% $C_2F_5Cl$ | 6.0 | −30 | 0.7 | 0.5 | 3.5 |
| 15 | Activated Alumina Alcoa–F-20 | $C_2F_6$+5.0% $C_2F_5Cl$ | 2.6 | −30 | 0.78 | 0.65 | 3.9 |
| 16 | Activated Charcoal "Norit" 12/20 mesh | $C_2F_6$+5.0% $C_2F_5Cl$ | 1.25 | −30 | 3.0 | 1.0 | 15.0 |

See footnotes at end of table.

TABLE II—Continued

| Ex. No. | Adsorbent | Mixture and Concen. percent v./v. | Flow Rate cc./cc./min. | T, °C. | g. purified g. adsorbent | g. purified cc. adsorbent | Wt. percent of Material Adsorbed |
|---|---|---|---|---|---|---|---|
| 17 | Activated Charcoal "Norit" 10/20 mesh. | $CF_4+21.6\%$ $CF_3Cl$ | 2.0–2.5 | −80 | 1.64 | 0.5 | 40.0 |
| 18 | Activated Alumina Alcoa—F-10 10/20 mesh. | $CF_4+0.57\%$ $CF_3Cl$ | 5 | −80 | 1.38 | +1.0 | 1.0 |
| 19 | Activated Charcoal "Norit" 10/20 mesh. | $CF_4+0.57\%$ $CF_3Cl$ | 10 | 20 | 1.28 | 0.4 | 0.76 |
| 20 | Activated Charcoal "Norit" 10/20 mesh. | $CF_4+0.57\%$ $CF_3Cl$ | 10 | 0 | 2.86 | 1.0 | 1.94 |
| 21 | Activated Charcoal "Norit" 10/20 mesh. | $CF_4+0.57\%$ $CF_3Cl$ | 10 | −43 | 7.4 | 2.3 | 4.95 |
| 22 | Activated Charcoal "Norit" 10/20 mesh. | $CF_4+0.57\%$ $CF_3Cl$ | 10 | −80 | 16.5 | 5.2 | 11.1 |
| 23 | Activated Charcoal "Norit" 10/20 mesh. | $CF_4+0.8\%$ $CF_3Br$ | 5–6 | −55 | 20.8 | 6.52 | 28 |
| 24 | Activated Charcoal "Norit" 10/20 mesh. | $CHF_3+3.9\%$ $CHClF_2$ | 2–2.5 | −37 | 3.7 | 1.11 | 17.5 |
| 25 | Activated Charcoal "Norit" 10/20 mesh. | $CH_2F_2+4.7\%$ $CH_2ClF$ | 3–5 | −5 | 2.03 | 0.6 | 17.2 |
| 26 | Activated Charcoal "Norit" 10/20 mesh. | $CF_3Cl+0.59\%$ $CF_2Cl_2$ | 4–6 | −30 | 5.1 | 1.7 | 3.65 | a Davison Chemcial Co., "Silica-Gel Type—O4".
b (42 p.s.i.g. pressure.)

It will be apparent from the preceding examples that activated charcoal is far more efficient and effective than the other adsorbents and was very efficient at temperatures up to about 40° C. above the boiling point of the higher boiling component (e.g. $CF_3Cl$) but, at materially higher temperatures, becomes rapidly less efficient and economically unattractive because of the small amount of material that is adsorbed, as shown by Examples 19 and 20. Also, it may be noted that the process fails to provide the desired separation with some other mixtures of fluorinated haloalkanes outside the scope of this invention, such as the binary mixture of cyclic $C_4F_8$ and cyclic $C_4F_7Cl$, and the binary mixture of $CF_3Cl$ and $CF_3Br$ wherein the halogen other than fluorine is different in the two components of the mixture.

It will be understood that the preceding examples have been given for illustrative purposes solely and that, subject to the limitations set forth in the general description, the mixtures treated, the adsorbents, and the conditions employed may be widely varied without departing from the spirit or scope of this invention.

From the preceding description, it will be apparent that this invention provides a method for separating highly fluorinated methanes and ethanes in a state of high purity from binary mixtures thereof with less highly fluorinated corresponding methanes and ethanes. The process is highly efficient, economical, and simple and easy to operate. Accordingly, this invention constitutes a valuable advance in and contribution to the art.

The embodiments of the invention in which an exclusive property or privilege is claimed are defined as follows:

1. A process for separating a polyfluoroalkane of the formula $C_nF_aH_cX_d$ from a binary mixture thereof with a minor proportion of a fluorohaloalkane of the formula $C_nF_bH_cX_e$ in which formulas $n$ is an integer of 1 to 2 and is the same for both members of the mixture, $a$ is an integer of 2 to 6 and is equal to at least $2n$, $c$ is an integer of 0 to 2, X is a halogen having an atomic weight between 35 and 80 and is the same in both members of the mixture, $d$ is an integer of 0 to 1, $b$ equals $a-1$, $e$ equals $d+1$, and each of $a+c+d$ and $b+c+e$ is equal to $2n+2$, which process comprises passing said binary mixture in the vapor phase over a solid adsorbent which is a member of the group consisting of silica gel, activated charcoal and activated alumina at a pressure of from about 1 to about 5 atmospheres and a temperature between the boiling point of the fluorohaloalkane and about 20° C. above said boiling point, employing a flow rate of from 0.1 to about 20 volumes of said binary mixture (calculated as a gas at 1 atmosphere and 25° C.) per volume of said solid adsorbent per minute, adsorbing said fluorohaloalkane on the solid adsorbent, and recovering the purified unadsorbed polyfluoroalkane.

2. A process for separating a polyfluoroalkane of the formula $C_nF_aH_cX_d$ from a binary mixture thereof with a minor proportion of a fluorohaloalkane of the formula $C_nF_bH_cX_e$ in which formulas $n$ is an integer of 1 to 2 and is the same for both members of the mixture, $a$ is an integer of 2 to 6 and is equal to at least $2n$, $c$ is an integer of 0 to 2, X is a halogen having an atomic weight between 35 and 80 and is the same in both members of the mixture, $d$ is an integer of 0 to 1, $b$ equals $a-1$, $e$ equals $d+1$, and each of $a+c+d$ and $b+c+e$ is equal to $2n+2$, which process comprises passing said binary mixture in the vapor phase over activated charcoal at a pressure of from about 1 to about 5 atmospheres and a temperature between the boiling point of the fluorohaloalkane and about 40° C. above said boiling point, employing a flow rate of from about 1 to about 12 volumes of said binary mixture (calculated as a gas at 1 atmosphere and 25° C.) per volume of said activated charcoal per minute, adsorbing said fluorohaloalkane on the activated charcoal, and recovering the purified unadsorbed polyfluoroalkane.

3. A process for separating a polyfluoromethane of the formula $CF_aH_cX_d$ from a binary mixture thereof with a minor proportion of a fluorohalomethane of the formula $CF_bH_cX_e$ in which formulas $a$ is an integer of 2 to 4, $c$ is an integer of 0 to 2, X is a halogen having an atomic weight between 35 and 80 and is the same in both members of the mixture, $d$ is an integer of 0 to 1, $b$ equals $a-1$, $e$ equals $d+1$, and each of the $a+c+d$ and $b+c+e$ is equal to 4, which process comprises passing said binary mixture in the vapor phase over a solid adsorbent which is a member of the group consisting of silica gel, activated charcoal and activated alumina at a pressure of from about 1 to about 5 atmospheres and a temperature between the boiling point of the fluorohalomethane and about 20° C. above said boiling point, employing a flow rate of from about 1 to about 12 volumes of said binary mixture (calculated as a gas at 1 atmosphere and 25° C.) per volume of said solid adsorbent per minute, adsorbing said fluorohalomethane on the solid adsorbent, and recovering the purified unadsorbed polyfluoromethane.

4. A process for separating a polyfluoromethane of the formula $CF_aH_cX_d$ from a binary mixture thereof with a minor proportion of a fluorohalomethane of the formula $CF_bH_cX_e$ in which formulas $a$ is an integer of 2 to 4, $c$ is an integer of 0 to 2, X is a halogen having an atomic weight between 35 and 80 and is the same in both members of the mixture, $d$ is an integer of 0 to 1, $b$ equals $a-1$, $e$ equals $d+1$, and each of the $a+c+d$ and $b+c+e$ is equal to 4, which process comprises passing said binary mixture in the vapor phase over activated charcoal at a pressure of from about 1 to about 5 atmospheres and a temperature between the boiling point of the fluorohalomethane and about 40° C. above said boiling point, employing a flow rate of from about 1 to about 12 volumes of said binary mixture (calculated as a gas at 1 atmosphere and 25° C.) per volume of said activated charcoal per minute, adsorbing said fluorohalomethane on the activated charcoal, and recovering the purified unadsorbed polyfluoromethane.

5. A process for separating a polyfluoromethane of the formula $CF_aH_c$ from a binary mixture thereof with a minor proportion of a fluorohalomethane of the formula $CF_bH_cX_e$ in which formulas $a$ is an integer of 2 to 4, $c$ is an integer of 0 to 2, X is a halogen having an atomic weight between 35 and 80, $b$ equals $a-1$, $e$ is an integer of 1 to 2, and each of $a+c$ and $b+c+e$ is equal to 4, which process comprises passing said binary mixture in the vapor phase over activated charcoal at a pressure of from about 1 to about 5 atmospheres and a temperature between the boiling point of the fluorohalomethane and about 40° C. above said boiling point, employing a flow rate of from about 1 to about 12 volumes of said binary mixture (calculated as a gas at 1 atmosphere and 25° C.) per volume of said activated charcoal per minute, adsorbing said fluorohalomethane on the activated charcoal, and recovering the purified unadsorbed polyfluoromethane.

6. A process for separating tetrafluoromethane from a binary mixture thereof with a minor proportion of chlorotrifluoromethane, which process comprises passing said binary mixture in the vapor phase over a solid adsorbent having a particle size of about 6 to about 20 mesh and which is a member of the group consisting of silica gel, activated charcoal and activated alumina at a pressure of from about 1 to about 5 atmospheres and a temperature between the boiling point of the chlorotrifluoromethane and about 20° C. above said boiling point, employing a flow rate of from about 1 to about 12 volumes of said binary mixture (calculated as a gas at 1 atmosphere and 25° C.) per volume of said solid adsorbent per minute, adsorbing said chlorotrifluoromethane on the solid adsorbent, and recovering the purified unadsorbed tetrafluoromethane.

7. A process for separating tetrafluoromethane from a binary mixture thereof with a minor proportion of chlorotrifluoromethane, which process comprises passing said binary mixture in the vapor phase over activated charcoal having a particle size of about 6 to about 20 mesh at a pressure of from about 1 to about 5 atmospheres and a temperature between the boiling point of the chlorotrifluoromethane and about 20° C. above said boiling point, employing a flow rate of from about 1 to about 12 volumes of said binary mixture (calculated as a gas at 1 atmosphere and 25° C.) per volume of said activated charcoal per minute, adsorbing said chlorotrifluoromethane on the activated charcoal, and recovering the purified unadsorbed tetrafluoromethane.

8. A process for separating tetrafluoromethane from a binary mixture thereof with a minor proportion of bromotrifluoromethane, which process comprises passing said binary mixture in the vapor phase over activated charcoal having a particle size of about 6 to about 20 mesh at a pressure of from about 1 to about 5 atmospheres and a temperature between the boiling point of the bromotrifluoromethane and about 20° C. above said boiling point, employing a flow rate of from about 1 to about 12 volumes of said binary mixture (calculated as a gas at 1 atmosphere and 25° C.) per volume of said activated charcoal per minute, adsorbing said bromotrifluoromethane on the activated charcoal, and recovering the purified unadsorbed tetrafluoromethane.

9. A process for separating $CHF_3$ from a binary mixture thereof with a minor proportion of $CHClF_2$, which process comprises passing said binary mixture in the vapor phase over activated charcoal having a particle size of about 6 to about 20 mesh at a pressure of from about 1 to about 5 atmospheres and a temperature between the boiling point of the $CHClF_2$ and about 20° C. above said boiling point, employing a flow rate of from about 1 to about 12 volumes of said binary mixture (calculated as a gas at 1 atmosphere and 25° C.) per volume of said activated charcoal per minute, adsorbing said $CHClF_2$ on the activated charcoal, and recovering the purified unadsorbed $CHF_3$.

10. A process for separating $CF_3Cl$ from a binary mixture thereof with a minor proportion of $CF_2Cl_2$, which process comprises passing said binary mixture in the vapor phase over activated charcoal having a particle size of about 6 to about 20 mesh at a pressure of from about 1 to about 5 atmospheres and a temperature between the boiling point of the $CF_2Cl_2$ and about 20° C. above said boiling point, employing a flow rate of from about 1 to about 12 volumes of said binary mixture (calculated as a gas at 1 atmosphere and 25° C.) per volume of said activated charcoal per minute, adsorbing said $CF_2Cl_2$ on the activated charcoal, and recovering the purified unadsorbed $CF_3Cl$.

11. A process for separating a polyfluoroethane of the formula $C_2F_aH_cX_d$ from a binary mixture thereof with a minor proportion of a fluorohaloethane of the formula $C_2F_bH_cX_e$ in which formulas $a$ is an integer of 4 to 6, $c$ is an integer of 0 to 2, X is a halogen having an atomic weight between 35 and 80 and is the same in both members of the mixture, $d$ is an integer of 0 to 1, $b$ equals $a-1$, $e$ equals $d+1$, and each of $a+c+d$ and $b+c+e$ is equal to 6, which process comprises passing said binary mixture in the vapor phase over activated charcoal at a pressure of from about 1 to about 5 atmospheres and a temperature between the boiling point of the fluorohaloethane and about 40° C. above said boiling point, employing a flow rate of from about 1 to about 12 volumes of said binary mixture (calculated as a gas at 1 atmosphere and 25° C.) per volume of said activated charcoal per minute, adsorbing said fluorohaloethane on the activated charcoal, and recovering the purified unadsorbed polyfluoroethane.

12. A process for separating $C_2F_6$ from a binary mixture thereof with a minor proportion of $C_2F_5Cl$, which process comprises passing said binary mixture in the vapor phase over activated charcoal having a particle size of about 6 to about 20 mesh at a pressure of from about 1 to about 5 atmospheres and a temperature between the boiling point of the $C_2F_5Cl$ and about 20° C. above said boiling point, employing a flow rate of from about 1 to about 12 volumes of said binary mixture (calculated as a gas at 1 atmosphere and 25° C.) per volume of said activated charcoal per minute, adsorbing said $C_2F_5Cl$ on the activated charcoal, and recovering the purified unadsorbed $C_2F_6$.

References Cited in the file of this patent

UNITED STATES PATENTS

| | | |
|---|---|---|
| 2,695,321 | Cines | Nov. 23, 1954 |
| 2,863,830 | Schneider et al. | Dec. 9, 1958 |
| 2,879,228 | Holeton | Mar. 24, 1959 |

UNITED STATES PATENT OFFICE
CERTIFICATE OF CORRECTION

Patent No. 3,026,359                                  March 20, 1962

Sebastian V. R. Mastrangelo et al.

It is hereby certified that error appears in the above numbered patent requiring correction and that the said Letters Patent should read as corrected below.

Column 1, line 13, for "fluorides" read -- fluorine --; line 22, after "fluorine" insert -- for chlorine --; column 3, Table I, column 4, line 2, thereof, the indistinct number should read -- -51.7 --.

Signed and sealed this 17th day of July 1962.

(SEAL)
Attest:

ERNEST W. SWIDER
Attesting Officer

DAVID L. LADD
Commissioner of Patents